United States Patent
Moser et al.

(10) Patent No.: US 6,347,255 B1
(45) Date of Patent: Feb. 12, 2002

(54) METHOD OF AUTOMATICALLY ADJUSTING THE SPEED CONTROLLER IN ELASTOMECHANICAL SYSTEMS

(75) Inventors: Roland Moser, Neumarkt; Hans-Peter Tröndle, Forchheim, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/216,452

(22) Filed: Dec. 18, 1998

(30) Foreign Application Priority Data

Dec. 23, 1997 (DE) .......................................... 197 57 715

(51) Int. Cl.⁷ .............................................. G05B 13/02

(52) U.S. Cl. ................................ 700/31; 700/55; 703/7

(58) Field of Search ........................ 700/31, 55; 703/6, 703/7

(56) References Cited

U.S. PATENT DOCUMENTS 4,305,360 A * 12/1981 Meyer et al. .......... 123/339.12
4,658,367 A *  4/1987 Potter ......................... 702/111

* cited by examiner

Primary Examiner—William Grant
Assistant Examiner—Sheela S. Rao
(74) Attorney, Agent, or Firm—Staas & Halsey LLP

(57) ABSTRACT

Various filter options in the current setpoint channel are available for optimal adjustment of a drive system to an elastomechanical system. The present method permits optimal adjustment of the speed controller through measurement of the speed control system by automatically determining possible parameters for a filter setting which may optionally be necessary. In a simulation calculation in the frequency range which relies on data from the measured system, a check is performed to determine whether the speed controller must be equipped with filters. In addition, the possible control parameters for the gain and the reset time of the speed controller are determined.

10 Claims, 3 Drawing Sheets

METHOD OF AUTOMATICALLY ADJUSTING THE SPEED CONTROLLER IN ELASTOMECHANICAL SYSTEMS

FIELD OF THE INVENTION

The present invention relates to a method of automatically adjusting a speed controller to an elastomechanical controlled system.

BACKGROUND INFORMATION

Various filter options in the current setpoint channel of the speed controller are usually available for optimal adjustment of drive systems to an elastomechanical system such as a numerically controlled machine tool, a robot, etc. A good knowledge of automatic control engineering is required to optimally utilize these filter options.

In the past, setting the filter has routinely been left to the user. This requires knowledge of automatic control engineering to correctly evaluate frequency responses measured manually, and knowledge of the drive system in order to correctly interpret the available measurement functions.

In addition to a conventional manual adjustment of the above-mentioned filter options of the speed controller to the elastomechanical system, the behavior of the controlled system (stimulation of pulses or sudden changes) is recorded and optimized according to time functions with automatic setting of the speed controller in the time range. The natural frequencies of a multi-mass oscillator can be determined in the time range only with a great deal of inaccuracy and, thus, they can hardly be controlled. Therefore, specific filtering of the resonant frequency, which might be critical for the speed controller, is impossible with the conventional technique. Only inadequate adjustment of the controller can be performed by low-order filters (e.g., current setpoint or actual speed value PT1 filters).

SUMMARY OF THE INVENTION

An object of the present invention is to create a method of automatic adjustment of a speed controller to an elastomechanical controlled system which relieves the user of manual optimization activities while also permitting a better adjustment in comparison with the prior art.

According to the present invention, this object is achieved by providing a method which includes the following steps:

1.1 calculating a transfer function for the mechanical frequency response, in particular using a Fourier transform into the frequency range, 1.2 identifying pole positions and zero positions in the mechanical frequency response and storing the pole positions thus found in a buffer memory, 1.3 calculating a transfer function for the closed speed control circuit, in particular using a Fourier transform into the frequency range, 1.4 identifying pole positions and zero positions in the transfer function of the closed speed control circuit, 1.5 selecting the pole position with the largest amplitude from the pole positions of the closed speed control circuit and assigning a corresponding pole position in the mechanical frequency response, 1.6 setting filter parameters for the respective pole position in the mechanical frequency response according to the respective pole position frequency and zero position frequency for filtering the current setpoints, 1.7 repeating steps 1.4 through 1.6 until a sufficiently accurate adjustment of the speed controller has been achieved and no further filtering is necessary.

The present invention is thus based in principle on performing all the required measurements to identify the elastomechanical controlled system and simulation calculations on the-speed controller in the frequency range. This has the advantage that multi-mass oscillators can be identified unambiguously in the frequency range and thus can be controlled easily.

According to a first advantageous embodiment of the method according to the present invention, the mechanical frequency response can be determined especially effectively. This is accomplished with the following additional steps:

2.1 stimulating the elastomechanical system to oscillate, in particular by applying white noise to the current setpoint with the current control circuit closed, 2.2 measuring actual speed values and actual current values, 2.3 performing Fourier transform of the measured values into the frequency range.

In another advantageous embodiment of the method according to the present invention, an especially good frequency resolution over the entire measuring range is made possible by the following additional steps:

3.1 performing steps 2.2, 2.3 and 1.1 once in the possible frequency range of the speed controller, then another time at a quarter of this frequency, 3.2 combining the two measurements to a common transfer function.

According to another advantageous embodiment of the method according to the present invention, additional influences on the measurements at the upper and lower frequency limits are eliminated. This is accomplished by the following additional step:

4.1 analyzing only the middle frequency range of the transfer function for the mechanical frequency response after smoothing by averaging.

In another advantageous embodiment of the method according to the present invention, an especially advantageous determination of the transfer function of the closed speed control circuit is made possible by the following additional steps:

5.1 measuring actual current values and current setpoints with a closed speed control circuit, with white noise in particular being injected into the current setpoint, 5.2 performing Fourier transform of the measured values to the frequency range.

In another advantageous embodiment of the method according to the present invention, optimal control parameters for the gain and the reset time of the speed controller can be determined by the following additional steps:

6.1 repeating step 1.3 while increasing the gain of the speed controller until the amplitude of the transfer function exceeds the value of a stored characteristic curve of the desired dynamics at any point, 6.2 repeating step 1.3 while reducing the reset time of the speed controller until the amplitude of the transfer function exceeds the value of another stored characteristic curve at any point.

DETAILED DESCRIPTION

Figure 1:
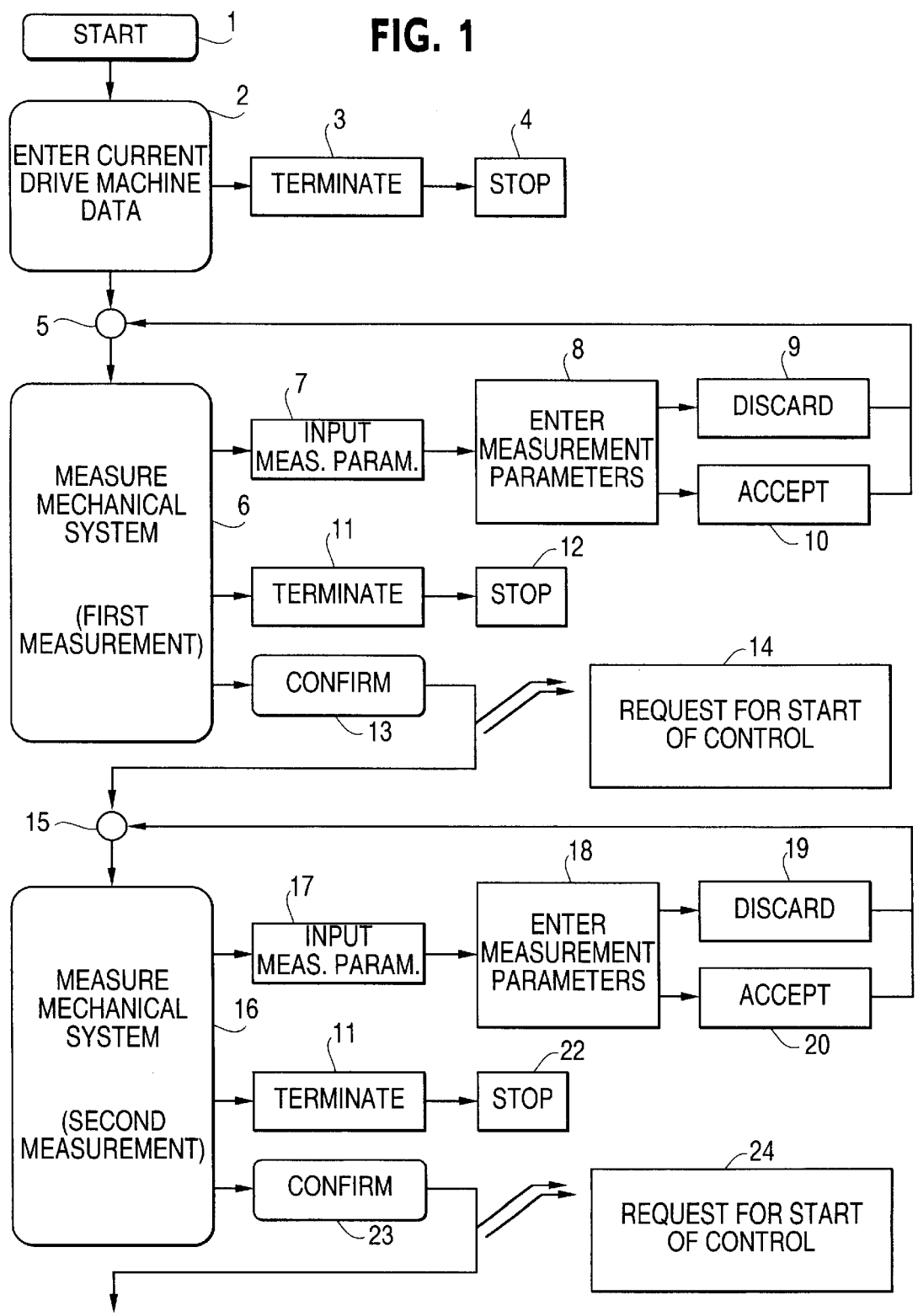
FIG. 1 shows a first flow chart of an automatic speed controller setting according to an exemplary embodiment of the present invention.
Figure 2:
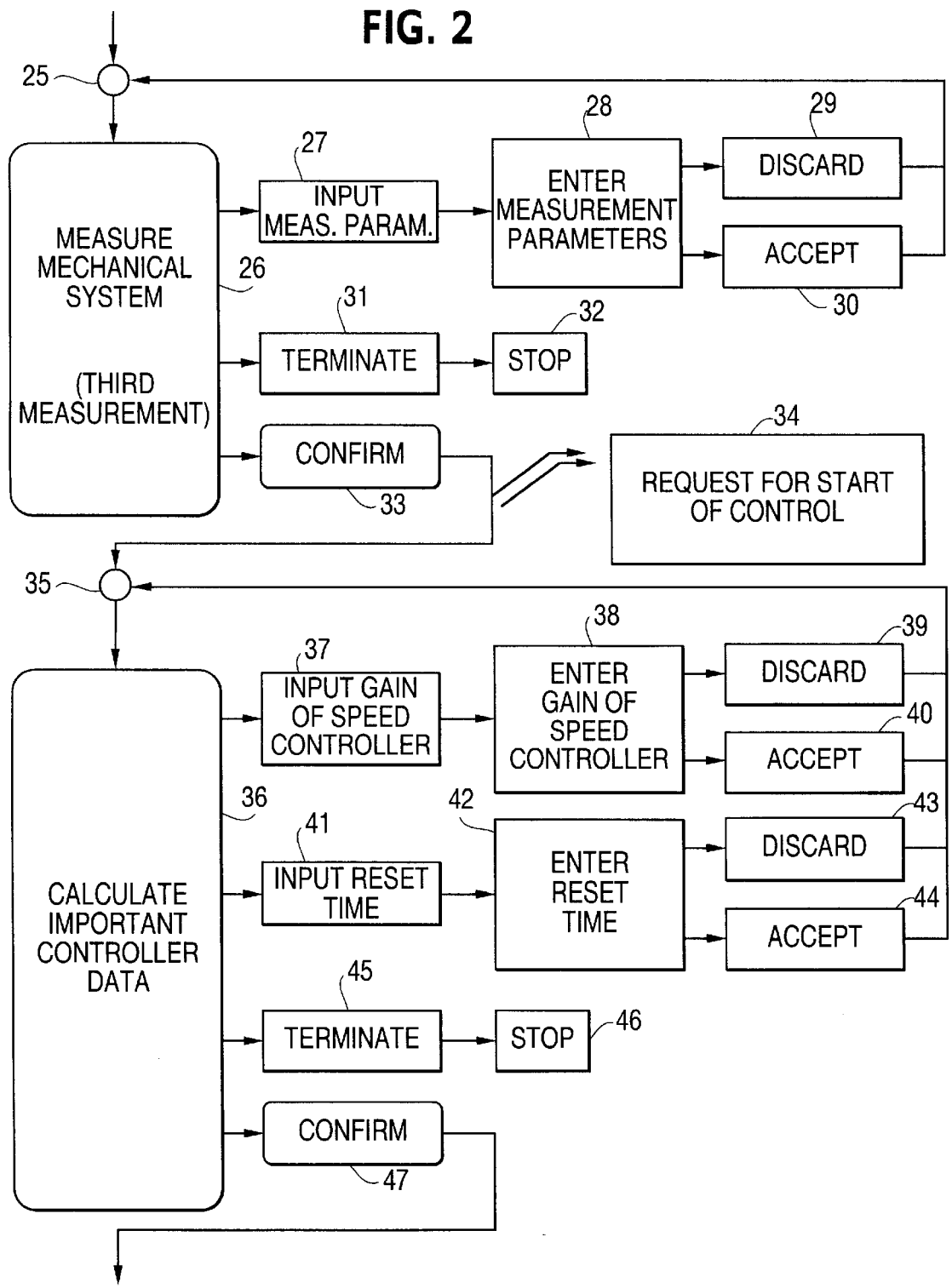
FIG. 2 shows a second flow chart of an automatic speed controller setting according to the exemplary embodiment of the present invention.
Figure 3:
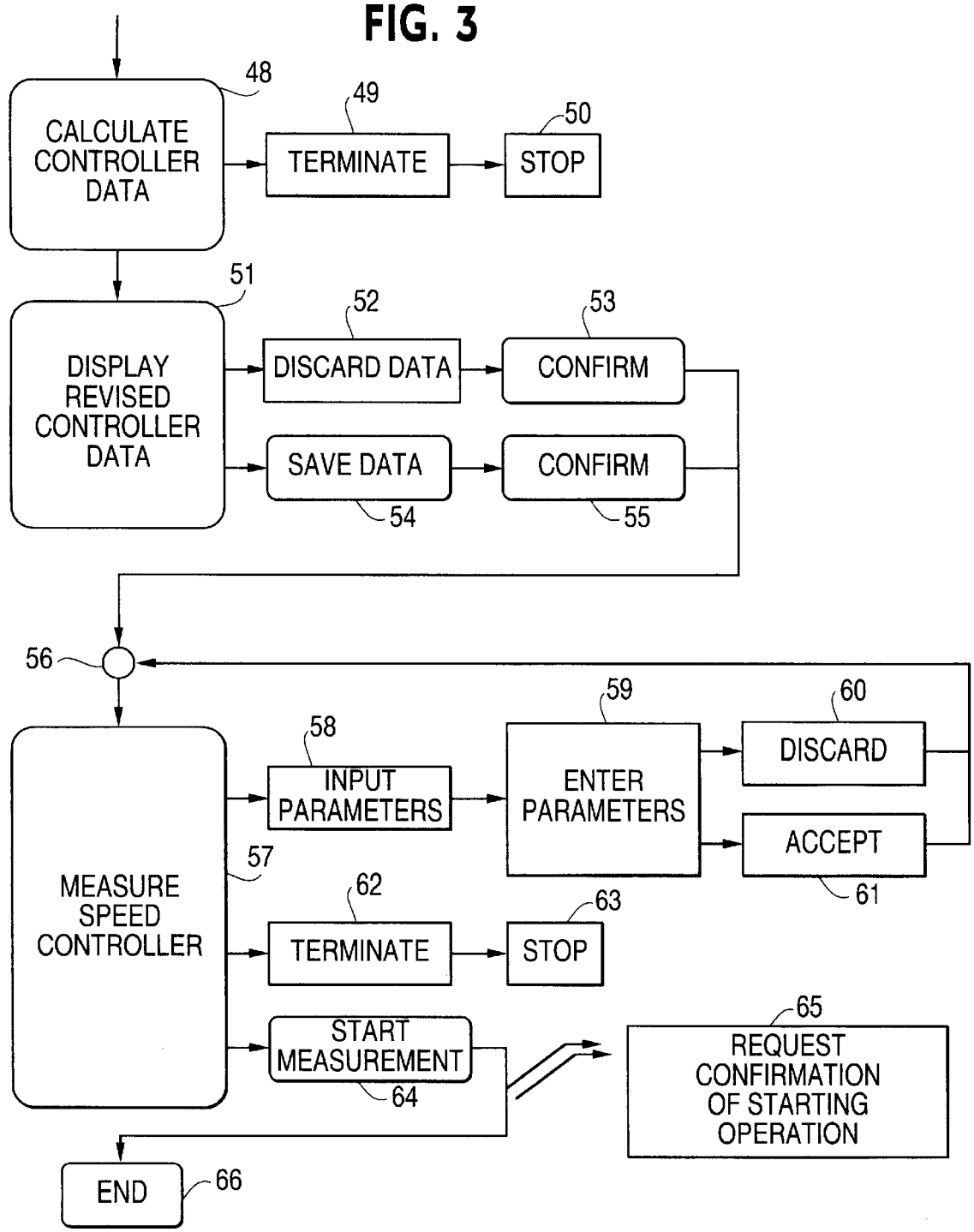
FIG. 3 shows a third flow chart of an automatic speed controller setting according to the exemplary embodiment of the present invention.

The diagrams in FIGS. 1 through 3 show a flow chart which has been divided into three parts for the sake of clarity, with the part of the flow chart shown in FIG. 2 being connected to the bottom end of the chart in FIG. 1, and the part of the flow chart in FIG. 3 being connected to the bottom end of FIG. 2.

The present invention is based in principle on performing all the required measurements for identification of the controlled system and simulation calculations in the frequency range. According to an especially advantageous embodiment whereby the controlled system can best be identified, a total of three measurements are performed. The flow chart begins with a start command 1, which is followed by a dialog 2 where the current drive machine data is entered and standard values are recorded. Dialog 2 can be terminated at any time by step 3, thus terminating the sequence in step 4.

First, in two measurements 6 and 16, the mechanical system is measured. The mechanical system is stimulated to oscillate by injecting white noise into the current setpoint. The actual speed value and the actual current value are measured, and the transfer characteristic is determined, for example, by a Fast Fourier transform or another corresponding transformation. Measurement parameters can be entered 8 at any time through step 7 and then either discarded in step 9 or accepted in another parallel step 10, whereupon the sequence jumps back to link 5 at the start of first measurement 6 of the mechanical system. In addition, a termination 11 is possible at any time, so that the measurement can be stopped in step 12 at any time.

The values for the current noise, the number of measurements over which averaging is to be performed, and the frequency range in which the measurement is performed can be changed freely by the user at any time. Normally no adjustment is necessary because the data is calculated from drive, converter and controller data.

Since measurements in the lower frequency range are very inaccurate, the measurement is performed once in the possible frequency range of the speed controller in first measurement 6 and a second time with one quarter of this frequency in a second measurement 16. If first measurement 6 is confirmed in a process step 13, so that the request for a start of control can be made in another process step 14, which can entail a traversing movement of the drive axle, the user comes to a dialog 16 via the second measurement.

This measurement is performed according to the same procedure as first measurement 6, apart from the different frequency range. Therefore, corresponding steps 17 through 24 which correspond to steps 7 through 14 are also provided.

The results of the two measurements 6 and 16 are then combined to a common curve which has a good frequency resolution over the entire measurement range. Thus, from measured actual speed values Dist and actual current values Sistl, this yields, using a Fast Fourier transform, a transfer function F1 describing the mechanical frequency response.

To eliminate even more interfering influences on the measurements at the upper and lower frequency limits, they are limited by analyzing only the middle measurement range of transfer function F1 and also by performing a smoothing by an averaging unit which may take place according to the following computation procedure, for example:

$$\text{measured value smoothed } (n) = [(\text{measured value } (n-2) + \text{measured value } (n-1) + \text{measured value } (n) + \text{measured value } (n+1) + \text{measured value } (n+2)]/5 \quad (1)$$

In this way, a subsequent controlled system identification and simulation of the speed controller with smoothed measured values of transfer function F1 are performed.

Then, the mechanical frequency response in the form of transfer function F1 is scanned at pole positions P1 and zero locations N1. The following conditions must be met for reliable detection of a pole position P1:

(measured value smoothed $(n)$ > measured value smoothed $(n+1)$)

AND (measured value smoothed $(n)$ > measured value smoothed $(n-1)$)(2)

If condition 2 is met, a zero position N1 with a smaller frequency than that of pole position P1 must be found, meeting the following conditions:

(measured value smoothed $(n-m)$ > measured value smoothed $(n-m+1)$)

AND (measured value smoothed $(n-m)$ > measured value smoothed $(n-m-1)$)

(Frequency of the instantaneous zero position > starting frequency of the simulation)

AND (frequency of the instantaneous zero position > frequency of the previous pole position)

(value of the pole position in dB > value of the zero position in dB + constant)

Pole positions P1 thus found are then stored in buffer memory.

At this stage in the sequence of the method according to the present invention, the user has run through all the steps in the chart according to FIG. 1, arriving at link 25 of that part of the flow chart illustrated in FIG. 2. Before the speed control circuit can be simulated, the closed current control circuit is also measured in a third measurement 26. In this third measurement dialog 26, steps 27 through 34 are also available, corresponding to steps 7 through 14 of first measurement 6 and steps 17 through 24 of second measurement 16. Third measurement 26 for measuring the current control circuit is performed as follows. White noise is injected into the current setpoint, and actual current values Sist2 and current setpoints Ssoll2 are measured. The transfer characteristic in the frequency range is also calculated by, for example, a fast Fourier transform again, by determining another transfer function F2 for the closed current control circuit. The values for current noise, the number of measurements over which averaging is to be performed and the frequency range in which the measurement is performed can be changed by the user at any time. An adjustment is not normally necessary because the data is calculated from motor, converter and controller data. Since this third measurement 26 is performed only in the possible frequency range of the speed controller, the high-resolution measured values of the lower frequency range in the measurement of the mechanical system must be calculated from available values with a lower resolution. The frequency response of the closed speed control circuit is calculated with these adjusted values, yielding another transfer function F2.

The user then goes to another linkage step 35, followed by a dialog 36 for calculating important controller data. In a step 35 following dialog 36, the user can enter parameters for the gain of the speed controller in a subsequent step 38 and can then either discard them in another step 39 or accept them in step 40, then returning to linkage step 35.

Corresponding steps 41 through 44 are provided for the reset time; the user can enter parameters for determining the optimal reset time here. Dialog 36 for determining the optimal control parameters of the gain and reset time can be terminated at any time in steps 45 and 46. Otherwise dialog 36 for calculating the controller data is confirmed in another step 47.

The additional steps of the flow chart then follow in the chart according to FIG. 3. There follows another dialog 48 where the controller data is calculated according to the procedure described above. This dialog 48 can also be terminated at any time in steps 49 and 50.

To do so, the steps for calculating additional transfer function F2 for the closed speed control circuit are repeated while increasing the gain of the speed controller until the amplitude at any point is greater than the characteristic curve stored according to the desired dynamics and type of optimization.

Then, according to the same pattern, the reset time is reduced until the amplitude is also greater than that of an additional characteristic curve K2 stored. Stored characteristic curves K1 and K2 can be altered by the user at any time, but no adjustment is usually necessary.

If the optimal values for gain V and reset time N have been found, a check is performed to determine whether a better adjustment of the speed controller to the elastomechanical controlled system can be achieved.

The check is performed as follows. The frequency response in the form of transfer function F2 of the simulated closed speed control circuit is searched for pole positions P2 and zero positions N2. The pole position with the largest amplitude is determined from pole positions P2 thus found. The zero position corresponding to that pole position in the mechanical frequency response is then sought, with the frequency of the mechanical pole position usually being smaller than the frequency of the pole position in the speed control circuit. If a mechanical pole position to which no filter has yet been parameterized is found, then the filter parameters for a corresponding filtering of the current setpoints are derived from the information such as the pole position frequency and zero position frequency, and the simulation is restarted. This procedure is repeated until either a maximum number of filters has been exhausted or the check described above reveals that no further filtering needs to be set. After the calculation is completed, a check is performed to determine at which number of filters the greatest possible proportional gain of the speed controller is achieved, and this data is transferred to the drive.

The revised controller data can be displayed in a subsequent dialog 51 and saved for a specific drive by the user confirming such storage in steps 54 and 55 or indicating in steps 52 and 53 that the data is not to be saved. The user then goes to a linkage step 56 which is followed by another measurement 57 for the speed controller.

Measurement 57 of the speed controller performed in this way can be terminated by steps 62 and 63 at any time. Likewise, parameters can be entered at any time in steps 58 and 59, and then either discarded in step 60 or accepted in step 61, after which the program returns to step 56. In step 64, measurement 57 of the speed controller is started by the user, and a request 65 for confirmation of the starting operation can be issued, because there is a traversing movement of the drive axle. Then, the method according to the present ends in step 66.

The preceding description of a possible embodiment of the method according to the present invention is merely one example of many conceivable flow charts for carrying out the method according to the present invention. The present invention determines possible parameters for any filter setting that might be necessary by measuring the speed control system in principle. In a simulation calculation in the frequency range using data from the measured system, a check is performed to determine whether the speed controller must be equipped with filters to be optimally adjusted to the elastomechanical controlled system. In addition, possible control parameters for the gain and reset time of the speed controller are also determined.

What is claimed is:

1. A method for automatically adjusting a speed controller of an elastomechanical controlled system, comprising the steps of:
   (a) calculating a first transfer function for a mechanical frequency response of the elastomechanical controlled system;
   (b) identifying first pole positions and first zero positions in the mechanical frequency response;
   (c) storing the first pole positions in a buffer memory;
   (d) calculating a second transfer function for a closed speed control circuit;
   (e) identifying second pole positions and second zero positions in the second transfer function;
   (f) selecting a particular pole position of the second pole positions having a largest amplitude;
   (g) assigning a corresponding pole position of the first pole positions to the particular pole position;
   (h) setting filter parameters for the corresponding pole position as a function of a respective pole position frequency and a respective zero position frequency for filtering predetermined current setpoints; and
   (i) repeating steps (e)–(h) until the speed controller is adjusted with a predetermined accuracy and without further filtering of the predetermined current setpoints.

2. The method according to claim 1, wherein step (a) is performed using a Fourier transform.

3. The method according to claim 1, wherein step (d) is performed using a Fourier transform.

4. The method according to claim 1, wherein step (a) includes the substeps of:
   (a1) stimulating the elastomechanical controlled system to oscillations,
   (a2) measuring first actual speed values of the mechanical frequency response and first actual current values of the mechanical frequency response, and
   (a3) transforming the measured actual speed values and measured actual current values into a predetermined frequency range using a Fourier transform.

5. The method according to claim 4, wherein the elastomechanical system is stimulated by applying a white noise to the predetermined current setpoints when a current control circuit is closed.

6. The method according to claim 4, wherein step (a) further includes the substeps of:
   (iv) performing steps (ii)–(iii) once in the predetermined frequency range of the speed controller to obtain a first measurement value,
   (v) performing step (iv) at one quarter of the predetermined frequency range to obtain a second measurement value, and
   (vi) combining the first and second measurement values to form the first transfer function.

7. The method according to claim 4, wherein step (a) further includes the substep of:
   (vii) analyzing only a middle frequency range of the predetermined frequency range of the first transfer function after smoothing by averaging.

8. The method according to claim 1, wherein step (d) includes the substeps of:
   (i) measuring second actual current values and second predetermined current values as a function of a white noise using the closed speed control circuit, and
   (ii) transforming the measured second actual current values into a predetermined frequency range using a Fourier transform.

9. The method according to claim 8, wherein step (d) further includes the substep of:
   injecting the white noise into the predetermined current setpoints.

10. The method according to claim 1, further comprising the steps of:
   (j) repeating step (d) while increasing a gain of the speed controller until an amplitude value of the second transfer function exceeds a first value of a first stored characteristic curve of predetermined dynamics; and
   (k) repeating step (d) while reducing a reset time of the speed controller until the amplitude value exceeds a second value of a second stored characteristic curve of the predetermined dynamics.

* * * * *